United States Patent Office 3,143,486
Patented Aug. 4, 1964

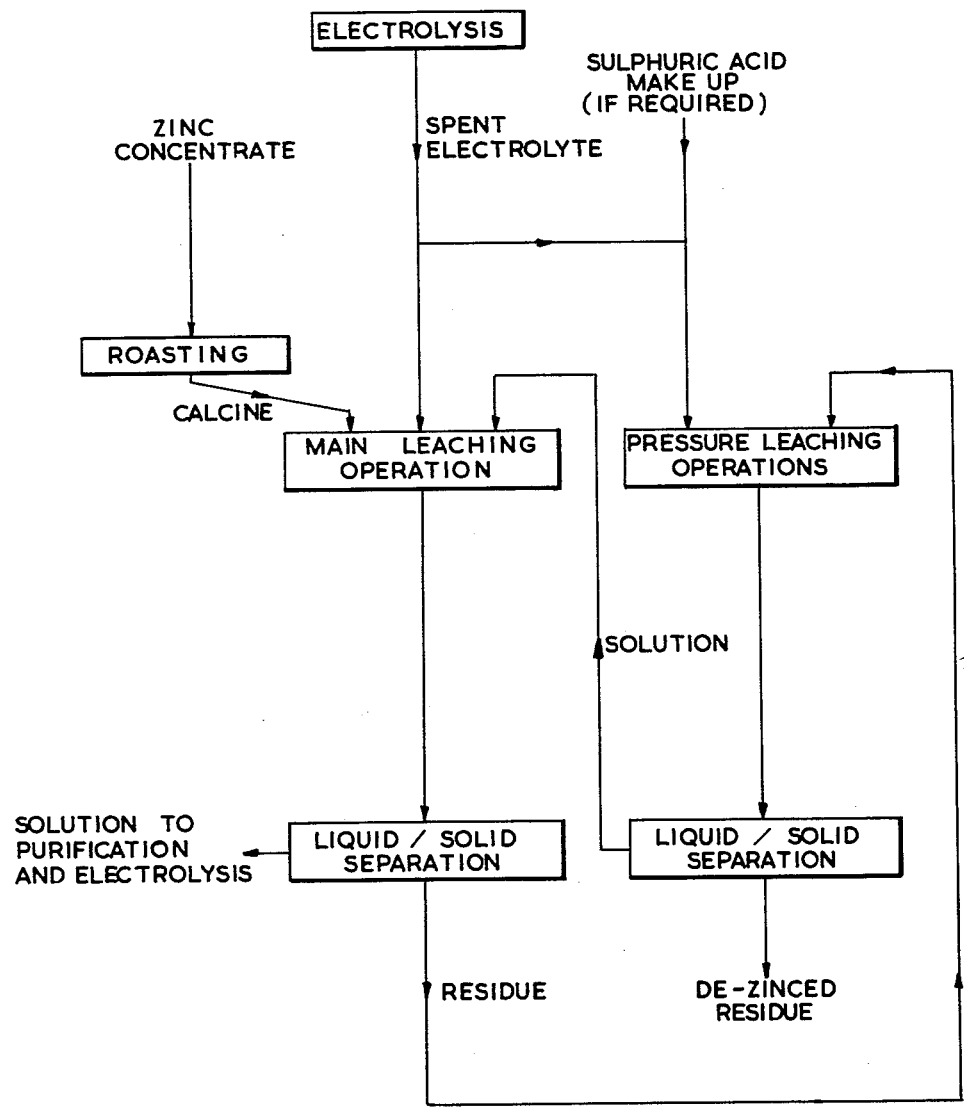

3,143,486
RECOVERY OF ZINC FROM ZINC PLANT
RESIDUE
Ralph Watt Pickering, Sandy Bay, Tasmania, and Edward
Whayman, Moonah, Tasmania, Australia, assignors to
Electrolytic Zinc Company of Australasia Limited,
Melbourne, Victoria, Australia
Filed Nov. 27, 1961, Ser. No. 155,074
Claims priority, application Australia Dec. 5, 1960
8 Claims. (Cl. 204—119)

This invention relates to the extraction of zinc from zinc plant residues by hyrdometallurgical methods. In this specification, the term "zinc plant residue" or "residue" refers to the material remaining when roasted or almost completely roasted zinc sulphide concentrate is leached with liquor containing sulphuric acid in the normal course of the electrolytic zinc process.

It is well known that during the roasting process, iron in the zinc concentrate combines to a substantial extent with zinc, to form a zinc ferrite, generally taken to have the formula $ZnFe_2O_4$, which is not dissolved during the subsequent leaching operation. As a result, the residue from the leaching stage commonly contains a significant quantity of zinc in the ferrite form. It will also contain some zinc sulphide, the actual amount being dependent on the completeness of the roasting operation. In the case of the applicant's plant at Risdon, Tasmania, for example, the residue contains about 22% of zinc of which 75–90% is usually in the ferrite form, and much of the balance is present as zinc sulphide.

The high iron content of zinc plant residues presents a problem in the development of any process for the extraction of zinc from such materials. The presence of significant quantities of iron in solution interferes with the efficient electrolytic recovery of zinc from zinc plant electrolytes. The removal of large quantities of iron from electrolytes can be costly and difficult, particularly if present as ferrous sulphate. It is therefore desirable to minimize iron uptake during any residue treatment operation. Further it is preferable to use the acid generated during electrolysis to dissolve the zinc from residue as the use of fresh acid would constantly increase the total sulphate content of the zinc plant circulating liquors. It is an object of this invention to efficiently extract the zinc content of zinc plant residues, while satisfying the above conditions.

We have found that by leaching the residue at high temperatures (and pressures) in a solution containing sulphuric acid, in a two stage process, we can rapidly and substantially completely dissolve the zinc content of the residue, and can leave substantially all the iron undissolved. We have found that the sulphuric acid solution used can be that produced during the electrolysis of zinc sulphate solutions in the customary procedures in plants for the production of electrolytic zinc i.e. zinc plant spent electrolyte.

The inxention broadly resides, therefore, in a process for the extraction of zinc from zinc plant residue containing zinc ferrite, which comprises subjecting the residue to a first stage pressure leaching treatment under non-oxidising conditions in a closed vessel in the presence of excess sulphuric acid at a temperature between 140° C. and 260° C., and then subjecting the said residue to a second stage pressure leaching treatment under oxidising conditions in a closed vessel in the presence of sulphuric acid at a temperature between 140° C. and 260° C.

According to one form of the invention, the method of extracting zinc from zinc plant residues is characterised by the following steps. Zinc plant residue, the zinc content of which is mainly as zinc ferrite, and containing between 0.5 and 5% of sulphide sulphur, mainly or wholly as zinc sulphide, is dispersed in zinc plant spent electrolyte. Sufficient spent electrolyte is employed to provide at least 150 percent of the stoichiometric acid requirement of the zinc in the residue. The resulting slurry is then agitated and heated in a closed autoclave to a temperature between 140° C. and 260° C., under a non-oxidising atmosphere such as steam, nitrogen, or carbon dioxide. This "first stage" leaching treatment is continued for a time sufficient to attack the major part of the zinc ferrite content of the residue. Iron is taken into solution during the first stage, non-oxidising, leaching treatment. Ferric sulphate is unstable at the temperatures used, and is largely precipitated by hydrolysis to a basic sulphate. Ferrous sulphate, which is stable at the temperatures and acidities used, is formed by reaction of ferric sulphate with the sulphide present in the residue.

The second stage of the process is characterised by the introduction of oxygen or oxygen-containing gas to the reactor, the temperature being in the same range, though not necessarily the same as that in the first stage. The over-pressure of oxygen within the reactor is maintained at or preferably above 5 p.s.i. during the second stage, in which the minor quantities of insoluble zinc compounds remaining in the residue are decomposed, and the ferrous sulphate is substantially completely oxidised to the ferric form and precipitated by hydrolysis. The slurry is then cooled, and the solution separated from the residual undissolved solids and precipitated iron compound. The solution containing dissolved zinc, a minor quantity of iron, and other constituents either dissolved from the residue or normally present in zinc plant spent electrolyte, can then be introduced in the leaching stage of the normal electrolytic zinc process, where the remaining free acid is readily utilised.

It can be seen that the main features of the process lie in the use of a first stage non-oxidising leaching treatment, followed by a second stage oxidising leaching treatment, the overall reaction being carried out at high temperatures and pressures, in the presence of an excess of sulphuric acid.

We have found that the use of a straightforward oxidising leach does not lend itself to the most economic extraction of zinc from residue, and that there is a considerable advantage in the operation of a two-stage process substantially as described herein.

The beneficial effect on the rate of zinc extraction obtained by the use of a non-oxidising atmosphere can be seen by reference to the following table (Table 1). The runs were identical except that a 45 p.s.i. over-pressure of nitrogen was used in the first case, and a 45 p.s.i. over-pressure of oxygen in the second case. The reaction slurries contained 126 gms. of dry residue (22% zinc, 2.5% sulphide sulphur) per litre of spent electrolyte (105 gms. sulphuric acid/litre, 45 gms. zinc/litre). The acid content of the slurries was 260% of the stoichiometric zinc requirements, and reaction temperature was 180° C. Zinc extractions were calculated from the zinc contents of the filtered leach solutions in each case.

TABLE 1

| Time at 180° C. (hours) | Zinc extraction (percent) | |
|---|---|---|
| | Nitrogen | Oxygen |
| ¼ | 63 | 60 |
| ½ | 77 | 63 |
| 1 | 79 | 67 |
| 2 | 95 | 75 |
| 4 | 95 | 79 |

It can be seen that the rate of zinc extraction is considerably enhanced under the non-oxidising conditions;

as a direct comparison, 79% extraction was reached in one hour under nitrogen, as opposed to four hours under oxygen. The enhanced rate obviously represents a considerable saving in the size of the equipment to be used, or a considerable increase in throughput using a plant of a given size.

For a given total reaction time, the advantage gained by operation of a two-stage leach as opposed to a straight oxidising leach, can be seen by reference to the following results (Table 2). Both slurries contained 167 gms. of dry residue (21.5% Zn, 3% sulphide sulphur), per litre of spent electrolyte (141 gms. acid/litre, 45 gms. zinc/litre), the acid content being 260% of the stoichiometric zinc requirement. Reaction temperature was 200° C. One run was carried out for two hours under a 100 p.s.i. over-pressure of oxygen throughout. The second run was carried out under steam for ½ hour, then 100 p.s.i. oxygen admitted for the following 1½ hours. Zinc extractions were calculated from the zinc contents of the residues at the termination of the runs.

TABLE 2

|  | Treatment with oxygen alone | Two-stage treatment |
| --- | --- | --- |
| Zinc extraction (percent) | 74 | 93 |
| Total iron in final solution (g./l.) | 2.4 | 2.0 |
| Ferrous iron in solution (g./l.) | 0.07 | 0.08 |

It can be seen that the zinc extraction is significantly increased by use of a two-stage leach, without loss of efficiency in iron precipitation.

The rate of zinc extraction in the first stage non-oxidising leach increases with increase in temperature as can be seen by reference to the following table (Table 3). Conditions other than temperature are the same throughout. The slurries contained 126 gms. of dry residue (21.5% zinc, 3% sulphide sulphur) per litre of spent electrolyte (105 gms. acid/litre, 45 gms. zinc/litre) the acid content being 260% of the stoichiometric zinc requirement. There was an over-pressure of 50 p.s.i. of nitrogen in each case. Zinc extractions were calculated from the zinc contents of the leached residues.

TABLE 3

| Time of reaction temperature (hours) | Reaction Temperature (° C.) | | | |
| --- | --- | --- | --- | --- |
|  | 140 | 160 | 180 | 200 |
| ½ | 43 | 46 | 74 | 84 |
| 1 | 48 | 56 | 82 | 92 |
| 1½ | 53 | 60 | 87 | 95 |
| 2 | 57 | 71 | 92 |  |
| 2½ | 60 | 76 | 93 |  |
| 3 | 63 | 80 | 94 |  |

The rate of zinc extraction increases with temperature in the oxidising second stage also, so that the overall rate of zinc extraction in the two-stage process increases with the reaction temperature. Further, it has been found that above about 180° C., the sulphide sulphur content of the residue is substantially converted to the sulphate form, rather than to free sulphur, as occurs below about 180° C. This sulphate formed can in part compensate for sulphuric acid loss in the process due to the formation of basic iron sulphate precipitate. It is therefore preferred to operate the second stage treatment at a temperature above 180° C., if significant quantities of sulphide sulphur are present in the original residue.

The rate of zinc extraction, or the completeness of zinc extraction in a given time, increases with increase in the excess of acid present in the reaction slurry over that required for combination with the zinc content of the residue. The minimum acid content for satisfactory zinc extraction has been found to be about 150% of the stoichiometric requirement of the zinc in the residue. There is no theoretical upper limit to the excess of acid that may be used. For a spent electrolyte of fixed acid content however, the excess of acid can only be increased by reduction of the pulp density of the slurry. There will, therefore, obviously be a point at which the higher extraction rates are offset by the increase in the volume of slurry to be treated. The rate of zinc extraction from residue is also found to increase with the initial acid concentration in the spent electrolyte used.

As is well known, the rate of oxidation of ferrous sulphate is dependent on the partial pressure of oxygen in the system. Oxygen over-pressures as low as 5 p.s.i. can be used in the oxidising second stage of the described process for the treatment of residue, but it is preferable to use partial pressures of 15 p.s.i. or above, to obtain economically satisfactory oxidation rates.

It should be noted that the invention has been described in a particular form, and as a batch process. This does not preclude the use of the process on a continuous basis, nor the incorporation of minor modifications or additions to the overall residue leaching operation, and these are to be regarded as falling within the scope of the invention.

The solubility of zinc sulphate is found to be depressed, at temperatures above 170° C., when the concentration of free acid falls below about 40 gms./litre. This does not restrict the application of the process, as the zinc ferrite continues to be attacked, the resulting undissolved or reprecipitated zinc compounds readily dissolving when the acidity rises during the oxidising stage due to oxidation of ferrous sulphate and hydrolysis of the resulting ferric sulphate, or when the reaction mixture is cooled prior to separating the solution from the insoluble solids.

The process, substantially as described herein, can be integrated with the normal process for the production of electrolytic zinc. One method by which this may be achieved is indicated in the accompanying diagrammatic flow sheet shown in the drawing.

In the normal process for the production of electrolytic zinc, zinc sulphide concentrate is roasted to a calcine consisting largely of zinc oxide, but containing also the ferrite formed by reaction between part of the zinc and the iron in the original concentrate. The calcine also contains minor quantities of incompletely roasted zinc sulphide.

The calcine is then leached in a sulphuric acid solution (spent electrolyte) which has been generated in the process of electrolysis. The residue after leaching, containing the zinc ferrite, any unroasted zinc sulphide, other insoluble constituents of the calcine, and precipitated materials such as iron hydroxide and silica, is separated for disposal or for treatment. The solution is then purified and electrolysed for recovery of zinc metal. Sulphuric acid is liberated in the electrolyte for re-use in the leaching stage.

In the incorporation of the process described in this specification into the normal electrolytic zinc plant operation, as shown in FIGURE 1, part of the spent electrolyte is diverted to the pressure leaching operations, where it is used to react with the residue under the conditions and substantially in the way described herein.

After completion of the pressure leaching operations, the treated residue, now denuded of the major part of its zinc content, is separated from the solution.

The solution, which now contains the zinc dissolved from the residue, can then be treated for the recovery of this zinc. One method of achieving this result is to introduce the solution into the normal leaching process such as is described briefly above. Here the excess acid present in the pressure leach solution can be used in dissolving zinc oxide from calcine, and the resulting pulp subjected to all the normal processes of liquid/solid separation, and solution purification and electrolysis.

Any losses of sulphate, either from the normal zinc plant processes, or as sulphates or basic sulphates in the final residue from the pressure leaching operations, can with benefit be replaced by adding strong sulphuric acid to that part of the spent electrolyte which is to be used in the pressure leaching operations. By this means enhanced reaction rates can be achieved, or alternatively, the pulp density increased, with the consequent benefit, for a fixed residue throughput, of reductions in the volume of slurry to be treated.

It should be noted that during the treatment of residue as described herein, other valuable metals such as copper or cadmium, if present in the residue, will be dissolved. These will be recovered in the normal operations for the separation of such metals from zinc plant electrolytes.

As illustrations of the results which can be obtained in the operation of the process, we quote the following examples. The autoclaves used in the following examples were externally heated corrosion resistant pressure vessels each fitted with an externally driven agitator operating through a gland in the autoclave cover plate.

*Example 1*

720 gms. of residue (containing on a dry basis 21.5% zinc, 28.6% iron, 2.3% sulphur as sulphate, 3% sulphur as sulphide, 0.14% copper, 0.13% cadmium, 4.7% lead and 15% moisture, as the main constituents) were charged into an autoclave together with 4 litres of spent electrolyte containing as the main constituents 132 gms. sulphuric acid/litre, and 45 gms. zinc/litre. The acid content of the resulting slurry was 260% of the stoichiometric acid requirement of the zinc in the residue. The autoclave was closed, and the gas space flushed with ni-nitrogen. The gas ports were then closed, the agitator started, and the slurry heated up to 200° C. The slurry was reacted for 60 minutes at 200° C., then a small slurry sample taken at the operating temperature and pressure. An over-pressure of 50 p.s.i. of oxygen was then admitted. The reaction was continued for a further 180 minutes at 200° C., the over-pressure of oxygen being maintained throughout. The autoclave was then rapidly cooled to room temperature and the contents removed and filtered. The filtrate was analysed. The filter cake was repulped in a small volume of water, filtered again, washed, dried and analysed. The solution and solids from the small slurry sample taken at the end of the first stage were also analysed. Results are shown below:

TABLE 4

|  | Sample at end of 1st Stage | | Final Slurry | |
| --- | --- | --- | --- | --- |
|  | Solutions (g./l.) | Residue (Percent) | Solutions (g./l.) | Residue (g./l.) |
| Zinc | 66 | 6.0 | 78 | 1.1 |
| Lead |  | 6.2 |  | 5.1 |
| Total Iron | 7.9 |  | 2.1 | 29.8 |
| Ferrous Iron | 7.1 |  | 0.4 |  |
| Cadmium |  |  | 0.2 | <.001 |
| Copper |  |  | 0.19 | .012 |
| Total Sulphur |  |  |  | 12.2 |
| Sulphur as Sulphate |  |  |  | 12.0 |
| Free acid |  |  | 46 |  |

The dry weight of the final residue was 570 gms. Extractions based on the final residue assays were: Zinc 95%, copper and cadmium both over 90%, iron 4.7%. The zinc extraction at the end of the first stage was about 79%. It can be seen that at the end of the first stage, most of the ferric iron had been precipitated, the major part of the iron which remained in solution being in the ferrous form. During the second stage 94% of the ferrous iron was oxidised and the zinc extraction raised to the final figure of 95%.

*Example 2*

145 gms. of residue and 1 litre of spent electrolyte of the same compositions as those used in Example 1 were charged into an autoclave, the acid content of the resulting slurry being 320% of the stoichiometric acid requirement of the zinc in the residue. The autoclave was closed and the gas space flushed with nitrogen. The gas ports were then closed, the agitator started, and the slurry heated up to 140° C. After reacting for 3 hours, the slurry was heated up to 200° C., a 50 p.s.i. over-pressure of oxygen admitted, and maintained, while the reaction was continued for a further 3 hours. The autoclave was then rapidly cooled, opened, and the contents removed and filtered. The final filtrate, and the washed and dried filter cake were analysed. Results are shown below:

TABLE 5

|  | Solution (g./l.) | Residue (Percent) |
| --- | --- | --- |
| Zinc | 72 | 2.3 |
| Total Iron | 1.8 | 27.4 |
| Ferrous Iron | 0.1 |  |
| Total Sulphur |  | 12.6 |
| Sulphur as Sulphate |  | 11.8 |
| Free Acid | 66 |  |

The weight of the final residue was 127 gms.
Extractions based on the final residue assays were: Iron 4.5%, zinc 89.3%.

The following example illustrates the effect of acid excess, for the same initial acid concentration, on the overall rate of zinc extraction:

*Example 3*

The process was operated in a series of runs with the pulp density as the only variable. 300 mls. of spent electrolyte (105 gms./litre acid, 45 gms./litre zinc) was charged into the autoclave in each case. The residue (22% zinc, 2.5% sulphur as sulphide, 15% moisture) charges were 61, 52, 50 and 42 gms., corresponding to acid contents of the slurries of 180, 210, 220 and 260% of the stoichiometric acid requirements of the zinc in the residue respectively. The operating temperature throughout was 180° C., and a 45 p.s.i. over-pressure of nitrogen was maintained during the 2 hour first stage, and a 45 p.s.i. over-pressure of oxygen maintained during the 2 hour second stage in each case.

Zinc extractions based on the zinc content of the filtered solution at the termination of each run are quoted below:

TABLE 6

| Acid content of slurry (percent) stoichiometric) | 180 | 210 | 220 | 260 |
| --- | --- | --- | --- | --- |
| Zinc in solution (g./l.) | 74 | 73.2 | 72.6 | 70.7 |
| Zinc extraction (percent) | 75 | 85 | 86.5 | 96.0 |

Higher temperatures or extended reaction times would increase the lower zinc extractions, but the effect of acid excess under otherwise fixed operating conditions is illustrated by the above results. Iron extractions were all of the order of 4%, showing that the main effect of acid content of the reaction slurry is upon the zinc extraction.

As illustrations of the effect of initial acid concentration at constant acid excess, on rate of zinc extractions, we quote the following Examples 4 and 5:

*Example 4*

Two runs (A and B) were carried out at a slurry acid content of 260% of the stoichiometric acid requirement of the zinc in the residue. In run A, 770 gms. of residue (21.5% zinc, 3.0% sulphur as sulphide, and 15% moisture) and 4 litres of spent electrolyte (141 gms. acid/litre, 45 gms. zinc/litre) were used. In run B, 720 gms. of the same residue, and 4 litres of spent electrolyte, (132 gms. acid/litre, 45 gms. zinc/litre) were used. In both cases, the autoclaves were closed, and the gas space flushed with nitrogen. The slurries were then heated up to 200° C., and reacted for 1 hour. A 70 p.s.i. over-pressure of oxygen was then admitted, and the runs continued at 200° C. for a further 3 hours under constant oxygen over-pressure. At intervals during the runs, small slurry samples were taken at the operating temperature and pressure. These samples were filtered, and the washed and dried filter cakes were analysed. Extractions were calculated from the zinc content of the residue samples taken, and the content of the unreactive constituent, lead.

Extractions at intervals during the runs are quoted below:

TABLE 7

| Time at 200° C. (Hours) | Zinc Extraction (Percent) | |
| --- | --- | --- |
| | Run A | Run B |
| ½ | 74 | 70 |
| 1 | 82 | 76 |
| | 70 p.s.i. Oxygen admitted | |
| 1½ | 86 | 82 |
| 2 | 92 | 85 |
| 2½ | 95 | 88 |
| 3 | 96 | 93 |
| 4 | 96 | 95 |

Example 5

Two runs (C and D) were carried out using the same residue as in Example 4 and a slurry acid content of 220% of the stoichiometric acid requirement of the zinc in the residue. In run C, 855 gms. of residue and 4 litres of spent electrolyte (132 gms. acid/litre, 45 gms. zinc/litre), and in run D, 680 gms. of residue and 4 litres of spent electrolyte (105 gms. acid/litre, 45 gms. zinc/litre) were used. The same conditions of temperature and gas pressure were used as in Example 4, but the stages were extended to 3 hours each in each case. Samples were taken, and zinc extractions calculated as before. Results are quoted below:

TABLE 8

| Time at 200° C. (hours) | Zinc Extraction (Percent) | |
| --- | --- | --- |
| | Run C | Run D |
| 1 | 73 | 68 |
| 2 | 81 | 76 |
| 3 | 86 | 80 |
| | 70 p.s.i. Oxygen admitted | |
| 4 | 91 | 85 |
| 5 | 93 | 89 |
| 6 | 95 | 92 |

As can be seen from Examples 4 and 5, at a given acid excess, the rate of zinc extraction increases with increase in initial acid concentration.

As illustration of the effect of temperature on operation of the process we quote the following Example 6:

Example 6

Three runs (E, F and G) were carried out, the only variable being temperature; 42 gms. of residue containing on a dry basis 22% zinc; 2.75% sulphur as sulphate; 2.3% sulphur as sulphide, and 15% moisture, and 300 mls. of spent electrolyte containing 105 gms. acid/litre, and 45 gms., zinc/litre were charged into the autoclave in each case. The gas space was flushed with nitrogen, and the slurries then heated up to reaction temperature. After reacting for 1 hour, 45 p.s.i. oxygen was admitted and the reactions continued at the same temperature for a further hour. The autoclave was then cooled in each case, and the contents removed and filtered. The filtrates and the washed and dried residues were analysed. Zinc extractions were calculated from the weights and zinc contents of the residues. Results are quoted below:

TABLE 9

| Reaction temperature (° C.) | Run E | Run F | Run G |
| --- | --- | --- | --- |
| | 140 | 180 | 200 |
| Zinc extraction (percent) | 56 | 81 | 91 |
| Sulphur as Sulphate in residue (percent) | 8.1 | 9.6 | 11.8 |
| Total Sulphur in residue (percent) | 11.6 | 10.4 | 12.0 |
| Total iron in solution (g./l.) | 3.7 | 2.9 | 2.0 |
| Ferrous iron in solution (g./l.) | 0.06 | 0.04 | 0.08 |

It can be seen that the zinc extraction in a given time increases, and the total iron in solution decreases, as the reaction temperature is raised.

The proportion of the total sulphur present as sulphate also increases as the temperature is raised, indicating more complete dissolution of zinc present as sulphide, and more complete oxidation of sulphides to sulphate.

We claim:

1. A process for the extraction of zinc from zinc plant residue containing zinc ferrite which consists essentially of subjecting the residue to a first stage leaching treatment in a substantially oxygen-free atmosphere in the presence of sulphuric acid is excess of that stoichiometrically equivalent to the zinc in the residue and at a temperature within the range from 140° C. to 260° C. and at a pressure which is at least the corresponding vapour pressure of the solution and subjecting the combined solid and liquid products of the first stage leaching treatment to a second stage leaching treatment in an atmosphere in which there is a partial pressure of oxygen amounting to at least 5 pounds per square inch absolute at a temperature within the range from 140° C. to 260° C. and at a total pressure which is at least the sum of the corresponding vapour pressure of the solution and the partial pressure of oxygen.

2. Process as defined in claim 1 in which the sulfuric acid in the first stage leaching treatment is at least 150% of the stoichiometric requirement of the zinc in the residue.

3. Process as defined in claim 1 in which the temperature in the first stage leaching treatment is within the range from 160° to 220° C.

4. Process as defined in claim 1 in which the pressure in the first stage leaching treatment is maintained greater than the vapour pressure of the solution corresponding to the temperature by the injection of an oxygen-free gas.

5. Process as defined in claim 1 in which the zinc plant residue contains from 0.5 to 5% of sulfur as sulfide.

6. Process as defined in claim 1 in which the sulfuric acid is introduced in the form of zinc plant spent electrolyte.

7. Process as defined in claim 1 in which after the second stage leaching treatment the resulting liquid is separated from solids and is introduced into the leaching stage of a normal electrolytic zinc process.

8. Process as defined in claim 1 in which the temperature in the second stage leaching treatment is within the range from 180° C. to 220° C.

References Cited in the file of this patent

UNITED STATES PATENTS

| 1,245,137 | Vadner | Oct. 30, 1917 |
| 1,362,166 | Laist et al. | Dec. 14, 1920 |
| 2,128,311 | Mertes | Aug. 30, 1938 |
| 2,825,949 | Haas | Oct. 6, 1957 |
| 2,996,440 | Forward et al. | Aug. 15, 1961 |

OTHER REFERENCES

Calyi: Trudy Soveshchaniya Po Met. Tsinka, 1954 (Moscow), 66–9 (1956), Chem. Abstract 54: 10721c.